(12) United States Patent
Pionetti

(10) Patent No.: US 7,722,088 B2
(45) Date of Patent: May 25, 2010

(54) LIGHT AND REINFORCED UNDERSEA COAXIAL PIPE ELEMENT

(75) Inventor: François-Régis Pionetti, La Baleine (FR)

(73) Assignee: Saipem S.A., Montigny le Bretonneux (FR)

( * ) Notice: Subject to any disclaimer, the term of this patent is extended or adjusted under 35 U.S.C. 154(b) by 531 days.

(21) Appl. No.: 11/792,743

(22) PCT Filed: Dec. 13, 2005

(86) PCT No.: PCT/FR2005/003121

§ 371 (c)(1),
(2), (4) Date: Jun. 12, 2007

(87) PCT Pub. No.: WO2006/067303

PCT Pub. Date: Jun. 29, 2006

(65) Prior Publication Data

US 2008/0149210 A1 Jun. 26, 2008

(30) Foreign Application Priority Data

Dec. 17, 2004 (FR) .................................. 04 13489

(51) Int. Cl.
*F16L 11/12* (2006.01)
(52) U.S. Cl. .................. 285/123.3; 285/47; 285/288.1; 285/290.1
(58) Field of Classification Search ............. 285/123.3, 285/47, 288.1, 290.1, 290.3
See application file for complete search history.

(56) References Cited

U.S. PATENT DOCUMENTS 3,693,665 A * 9/1972 Veerling et al. ............... 285/47

3,794,358 A * 2/1974 Allen et al. .................... 285/47
4,079,967 A * 3/1978 Schoessow ................... 285/47
4,174,123 A * 11/1979 Schluderberg ............... 285/47
4,560,188 A 12/1985 Berti et al.

(Continued)

FOREIGN PATENT DOCUMENTS

EP 0635667 1/1995

(Continued)

*Primary Examiner*—David E Bochna
(74) *Attorney, Agent, or Firm*—Cohen Pontani Lieberman & Pavane LLP

(57) ABSTRACT

A unit element of undersea pipe, in particular for providing a bottom-to-surface connection, constituted by an assembly of two coaxial pipe elements of the PiP type (1) presenting an inner pipe element (2) and an outer pipe element (3) coaxial thereabout with an annular space ($4_1$) between the pipes, preferably including a thermally insulating material ($4_2$) in the annular space, and including at each end a junction piece (6, 6a-6b) in the form of a steel forging for connecting together two of the unit elements of axial pipe (1), the junction forgings (6) being welded to the ends of both of the inner and outer pipes, the unit elements being characterized in that the inner pipe element (2) comprises in its main portion an inner tube ($2_1$) of metal presenting thickness that is small relative to the thickness of the ends of the inner pipes that are welded to the junction forgings (6), the thickness of the inner tube being less than 50% the thickness of the ends of the inner pipe, the inner tube (2) being covered in a material ($2_2$) comprising longitudinal continuous fibers wound around the inner tube so as to cover the surface of the inner tube entirely.

20 Claims, 4 Drawing Sheets

U.S. PATENT DOCUMENTS

| | | | |
|---|---|---|---|
| 4,609,214 A * | 9/1986 | Bonjour et al. | 285/47 |
| 4,640,532 A * | 2/1987 | Pope | 285/47 |
| 4,997,211 A * | 3/1991 | Brucher | 285/47 |
| 5,390,961 A * | 2/1995 | Guthrie | 285/47 |
| 5,447,339 A * | 9/1995 | Marchal et al. | 285/47 |
| 5,732,981 A * | 3/1998 | Brucher et al. | 285/47 |

FOREIGN PATENT DOCUMENTS

| | | |
|---|---|---|
| GB | 2161565 | 1/1986 |
| GB | 2396196 | 6/2004 |

* cited by examiner

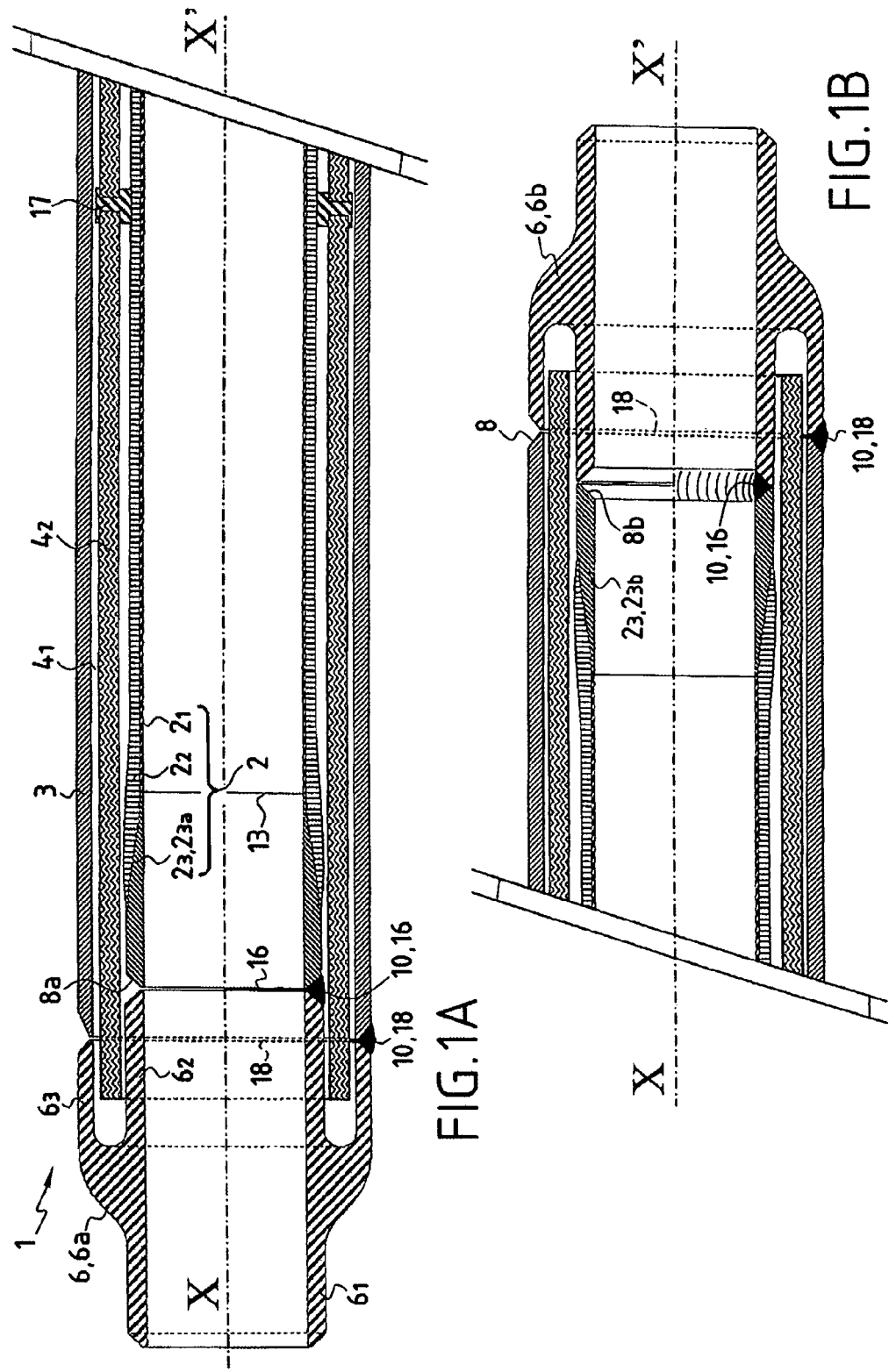

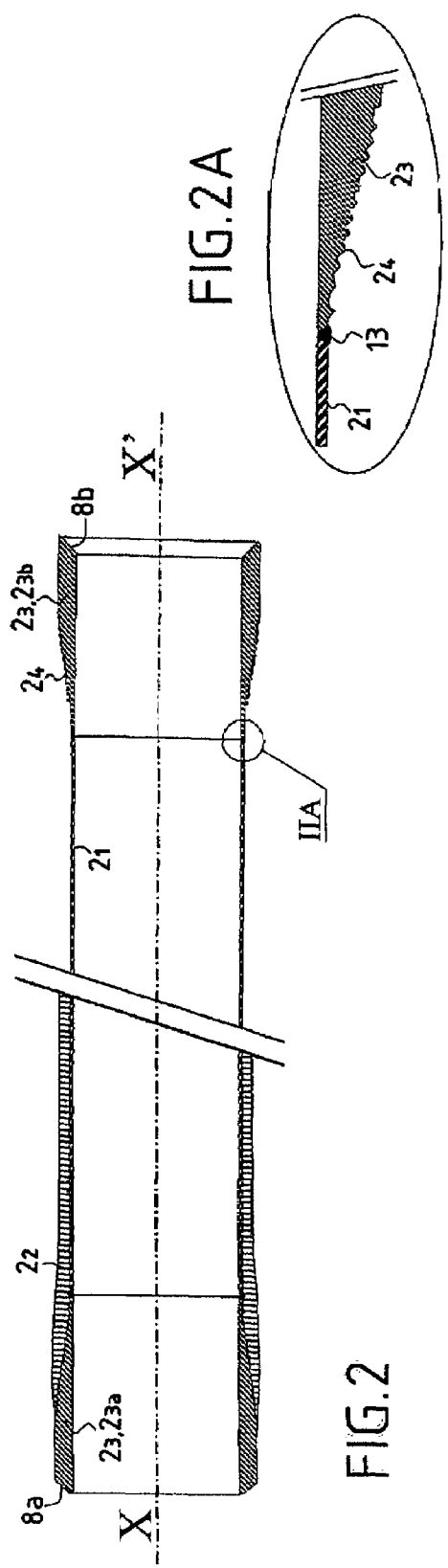
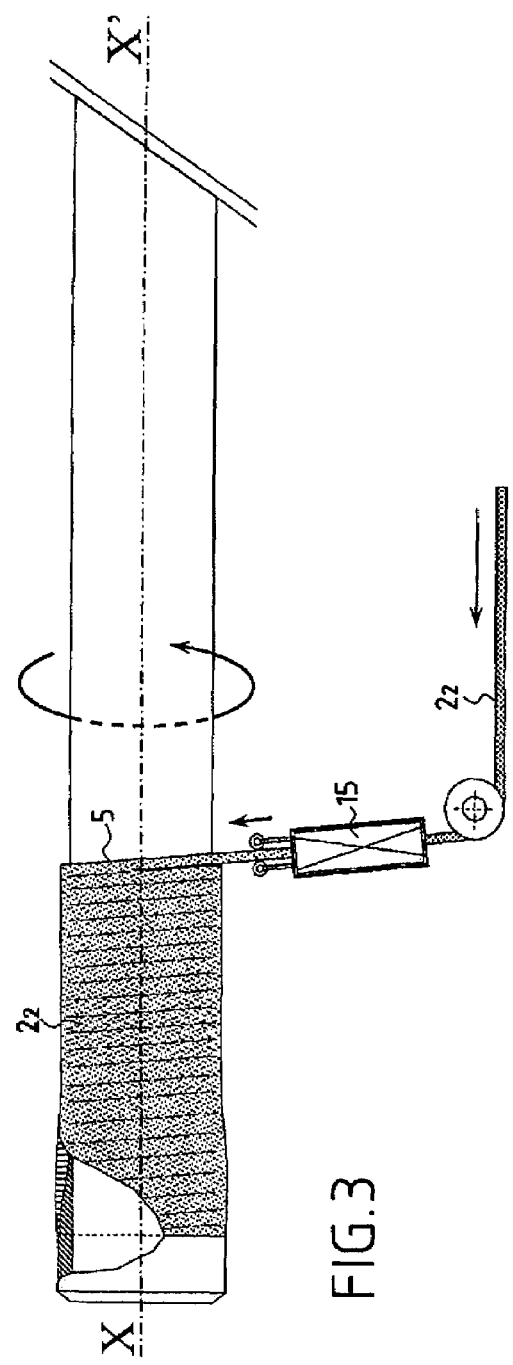

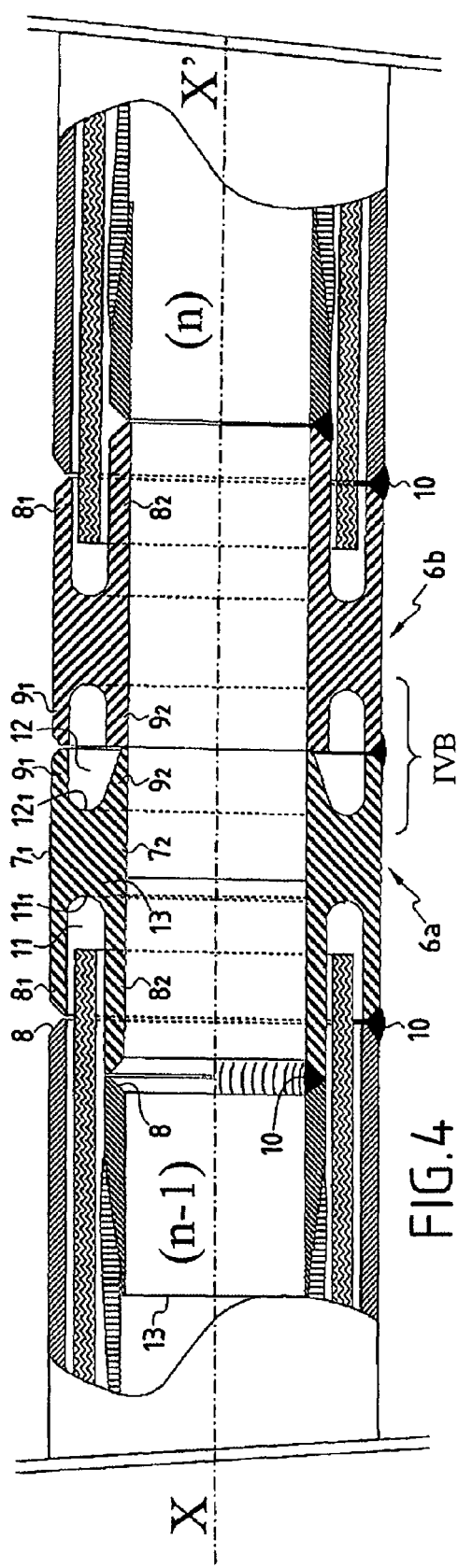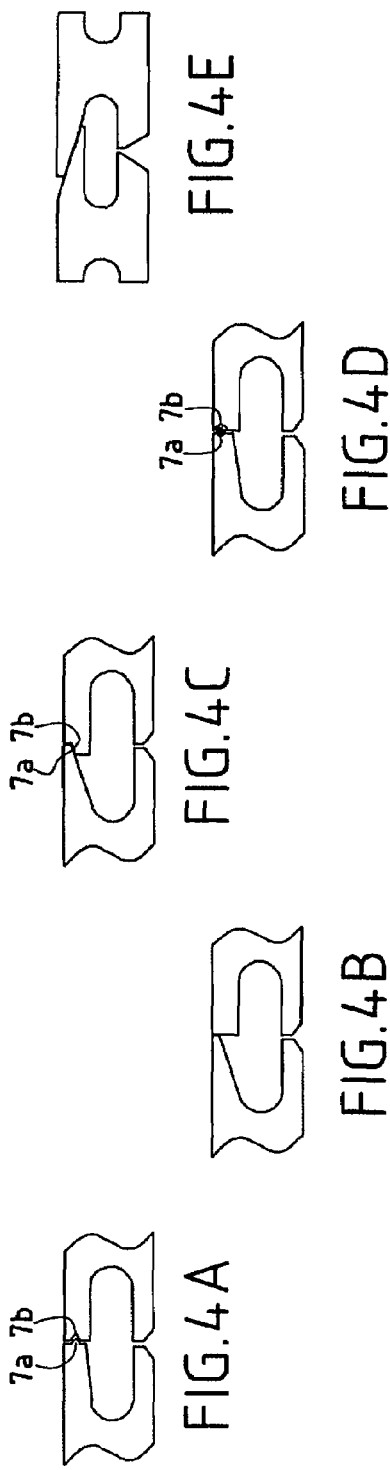

US 7,722,088 B2

LIGHT AND REINFORCED UNDERSEA COAXIAL PIPE ELEMENT

PRIORITY CLAIM

This is a U.S. national stage of application No. PCT/FR2005/003121, filed on Dec. 13, 2005. Priority is claimed on the following application(s): Country: France, Application No.: 04/13489, Filed: Dec. 17, 2004.

FIELD OF THE INVENTION

The present invention relates to the field of coaxial double-walled pipes including an insulating complex, in particular undersea pipes for conveying fluids that are hot or cold.

The present invention relates in particular to undersea pipes with reinforced insulation, installed on oil fields at great depths, and also to pipes suspended between the bottom of the sea and a surface ship anchored on said oil field.

BACKGROUND OF THE INVENTION

In most industrial fields it is desirable to find high performance insulation systems for keeping the fluids conveyed in pipework at constant temperature, so as to make it possible to transfer fluids between equipments that are considerable distances apart, e.g. of several hundreds of meters or even of several kilometers. Such distances are frequent in industries such as oil refineries, liquefied natural gas installations (at −165° C.), and undersea oil fields, extending over several tens of kilometers. Such oil fields are being developed in ever increasing depths of water, where depths can significantly exceed 3000 meters (m).

Numerous systems have been developed to reach a high degree of thermal performance, and specific versions have been developed to operate in satisfactory manner at great depths, i.e. to withstand the pressure at the bottom of the sea. The highest performance technologies that have been developed for this purpose are known as "pipe-in-pipe" or "PiP", in which an inner pipe conveys the fluid and an outer pipe disposed coaxially about the inner pipe comes into contact with the surroundings, i.e. the sea. The annular space between the two pipes may be filled with an insulating material, or it may be evacuated of all gas.

In very great depths, i.e. 2000 m or 3000 m, or even more, the weight of pipes increases very quickly since the outer pipe must withstand the pressure and as a result it is very thick. Thus, laying such pipe requires very heavy equipment, since in the catenary configuration taken up by the pipe while it is being laid, not only does the length of said catenary increase with increasing depth, but also its unit weight, since the outer pipe must withstand a greater implosion pressure, thereby leading to very high levels of tension in the pipe, at the laying tower installed on the ship, which tensions can reach 500 (metric) tonnes to 700 tonnes, or even 1000 tonnes or more.

In that type of pipe, the annular space, optionally filled with an insulating material, is generally at an absolute pressure that is lower than atmospheric pressure, or is even evacuated of all gas, and to a first approximation it can be considered that the inner pipe must withstand radially the bursting pressure due to the internal fluid, while the outer pipe withstands the implosion pressure created by the hydrostatic pressure at bottom level (ρ.g.h) which is about 1 megapascal (MPa) per 100 m of depth of water, i.e. 30 MPa at a depth of 3000 m. An effect of axial expansion or longitudinal stretching due to pressure, known as the "bottom effect" acts on the circular section of the outer and inner pipes and parallel to the axis of said pipes, and is shared, to a first approximation, by both pipes (because they are interconnected at their ends), prorata their respective sections of material, generally steel.

The internal pressure P within a pipe leads firstly to a "bottom effect" or "piston effect" that is characterized by an axial longitudinal force tending to stretch or longitudinally expand said pipe, and it has the value $F_i=P \times s$, where s is the section of the pipe. Secondly, the internal pressure generates a "radial effect" tending to cause the pipe to burst, with the force acting on a unit length of the wall having the value $F_e=\pi \times R \times P$, where R represents the inside radius of the pipe.

The inner pipe must therefore also be strong and thus present increased thickness when laying at great depths in order to be able to withstand the bottom effect and the bursting radial effect.

Thus, the first problem posed by the present invention is to provide a PiP type insulated pipe of lighter weight so as to present weight per unit length that is considerably reduced, while continuing to present mechanical reinforcement characteristics that ensure that its fatigue behavior is capable of withstanding the stresses generated during laying at great depth.

In installations at great depth, undersea pipes and undersea coaxial pipe assemblies are assembled on land to constitute elements of unit length, of the order of 20 m to 100 m depending on the holding capacity of the laying system. They are then transported in that form out to sea on a laying ship. During laying, the unit lengths of the various coaxial pipe assembly elements are connected to one another on board the ship while they are being laid at sea. It is thus important for the connection operation to be capable of being integrated in the method of assembling and laying the pipe on the sea bottom while slowing the method down as little as possible, in other words the operation must be capable of being performed quickly and easily.

When laying a conventional PiP at great depth, said PiP is subjected to bending, mainly in its bottom portion close to the sea bottom. The bending is at its maximum at the point of contact with the bottom since the radius of curvature decreases from the surface down to the point of contact with the bottom, where it is then at a minimum, after which the PiP rests substantially horizontally on the sea bottom so as to present a radius of curvature that is infinite. The bending generated during laying generates high levels of stress in each of the tubes of the PiP and in the zone interconnecting two successive lengths of PiP.

Junction parts are used in the form of connecting steel forgings that are assembled to the ends of said coaxial pipe assembly elements that are to be assembled together. The junction forging at the downstream end of a first coaxial pipe assembly element that has not yet been assembled is connected to the upstream free end junction forging of a second coaxial pipe assembly element that has already been assembled downstream.

Patents GB-2 161 565 and GB-2 191 842 describes a PiP and its method of assembly, and give two embodiments of junction or connection pieces made of forged steel, the first patent GB-2 161 565 describing a forging made as a single piece, and the second patent GB-2 191 842 describing a forging made up of two elements with the junction between the two elements of two junction forgings being provided by a screw thread, said thread being glued in order to provide sealing.

In both configurations, the forging has two circularly symmetrical branches comprising an outer branch and an inner branch defining between them an annular space, i.e. forming a fork with free cylindrical ends that are assembled to the cylindrical ends respectively of the outer and the inner pipes.

Nevertheless, in both embodiments, shortcomings are observed in the mechanical reliability of the connection of unit lengths of coaxial pipe assembly fitted at their ends with such junction or connection forgings.

One of the shortcomings of the junction forgings proposed in those prior patents lies in the diameter of the forgings in the connection zone thereof is reduced so as to correspond substantially to the diameter of the inner pipe. This leads to a very large change in the second moment of area of the cross-section of the PiP between the main zone of said PiP and the connection zone between two unit lengths of the PiP, thereby creating a point of weakness at each of said connections by welding between two forgings, the zone of said welding then being particularly sensitive to fatigue phenomena, both during laying and throughout the lifetime of the pipe.

In order to avoid that zone of weakness and to conserve a second moment of area for the cross-section that is substantially constant, it is possible to increase the wall thickness of the forging throughout the zone situated between the solid portion of said forging and the chamfered zone where welding is performed. However that would generally require said thickness to be almost doubled. With pipes of large diameter or that are to be laid in great depths, welding then becomes problematic because of the very great thickness of steel, which thicknesses may reach 40 millimeters (mm) to 50 mm, thus requiring welding methods that are very difficult, and under certain circumstances that are practically impossible without defects, given the dynamic effects at sea on the mass of molten steel. Furthermore, since said welding is performed on board laying ships, where such ships present an extremely high hourly cost, the cost of the installation becomes prohibitive and the risks of failure are considerable because of the complexity of said welding operations performed on site.

It is then preferable to use the method described in patent FR-2 751 721 which consists, in a particular way of making the ends of a PiP, associated with a particular way of reinforcing the connection zone between two unit lengths of PiP by means of a sliding sleeve with little clearance relative to the outer pipe, said sliding sleeve being secured to said outer pipe by adhesive. That disposition makes it possible locally to increase the second moment of area of the cross-section so as to limit the stresses in the connection zone between two unit lengths of PiP, however it requires several mechanical parts to be fabricated that are complicated to assemble together and that require a relatively difficult connection operation to be performed. In addition, the proposed adhesive remains subject to creep and deteriorates over thermal cycling of the kind to which the pipes are subjected during their lifetime of 20 years to 30 years. Finally, that type of adhesive cannot be provided in reliable manner for bottom-to-surface connections, since the dynamic effects of the swell and of current on the pipe suspended between the sea bottom and the floating support quickly degrade the plane of adhesion, leading to rapid and excessive fatigue over the connection zone of the PiP.

Thus another problem of the present invention is to make a connection between lightweight insulated pipes of the PiP type in which the connection zones between two unit lengths are reinforced so that the stresses generated during laying are minimized.

More precisely, another problem posed is to make a connection between unit lengths of PiP type coaxial pipe assemblies that is improved so as to make it easier to implement the connection means and to perform connection operations, in particular by optimizing laying equipment, and in which the connection zones between two unit lengths are reinforced, so that the stresses generated during laying are minimized and so that the fatigue behavior in bottom-to-surface connections is radically improved.

It is known to make pipes completely out of composite material. However they are generally of high cost and present the major drawback of being buoyant under certain situations, which means that they need to be weighted down by adding external mass so that they stay in position after being laid, or even so as to make laying possible.

In addition, and above all, pipes made of composite material are:
either made as continuous lengths that can therefore not be made by connecting together unit assemblies of coaxial pipe on board a laying vessel at sea;
or else made by connecting together unit elements on board a laying ship at sea; but under such circumstances, connecting together said unit elements of composite material presents major complications due to the stresses in the connection zone between two successive lengths. Junction parts made out of composite material are not strong enough, given the stresses in the vicinity of the connection. Furthermore, junction forgings made of steel are not easily fitted to coaxial pipe elements made of composite material.

Finally, when it is desired to convey a corrosive fluid in the inner pipe, e.g. such as $H_2S$, it is necessary to provide an extra thickness of stainless steel that is suitable for withstanding such corrosion, thereby firstly further increasing the weight of the pipe, and secondly being complex and expensive to make.

A final problem on which the present invention is based is thus that of providing a PiP pipe assembly comprising an inner pipe whose inside wall is made of special anti-corrosion steel without making the pipe heavier and in a method of fabrication that is simplified.

EP 0 635 667 discloses simple undersea pipes made of steel that can be said to be "bound" because they are reinforced by composite material deposited by winding glass or carbon fibers over the length of each of the elements apart from their end portions, said end portions being reinforced after said elements have been interconnected on board the laying ship, within the J-lay tower, so as to present substantially uniform strength all along said pipe. With that type of composite pipe, the fibers are wound at an angle lying in the range 65° to 87°. The steel pipe must be capable of fully withstanding the bottom effect, while the radial bursting effect is taken up essentially by the composite reinforcement. During laying, all of the laying tension is taken up by the steel pipe, the composite material reinforcement not contributing significantly to the traction strength of the steel and composite pipe. In that type of single-walled steel and composite pipe, the composite material performs a binding role only, and the steel pipe must present sufficient strength of withstand traction forces during laying and also the bottom effect when the pipe is under pressure, thus requiring thickness that is indeed likely reduced but still relatively large for the steel wall of said pipe, and in particular greater than more than 50% of the thickness of the non-reinforced ends of the pipe or of a steel pipe of the same diameter for taking up the same bottom effect. The reduction in weight that is obtained by such a disposition is therefore fairly limited. In addition, that type of pipe does not present sufficient thermal insulation properties.

The various problems on which the present invention is based are solved by providing a coaxial pipe element in which the inner pipe is made of a composite material comprising a very thin inner tube of metal that is covered by inorganic fibers wound around said inner tube, i.e. a tube having thickness that is less than 50% that of a steel pipe of the same diameter needing to withstand the same bottom effect in full.

SUMMARY OF THE INVENTION

More precisely, the present invention provides a unit element of undersea pipe, in particular for providing a bottom-to-surface connection, constituted by an assembly of two coaxial pipe elements of the PiP type presenting an inner pipe element and an outer pipe element coaxial thereabout, with an annular space between the pipes, preferably including a thermally insulating material in said annular space, and including at each end a junction piece in the form of a steel forging for connecting together two of said unit elements of axial pipe, said junction forgings being welded to the ends of both of said inner and outer pipes, said unit elements being characterized in that said inner pipe element comprises in its main portion an inner tube of metal presenting thickness that is small relative to the thickness of the ends of said inner pipes that are welded to said junction forgings, the thickness of said inner tube being less than 50% the thickness of said ends of said inner pipe, said inner tube being covered in a material comprising longitudinal continuous fibers wound around said inner tube so as to cover the surface of said inner tube entirely.

Winding the inorganic or composite material fibers around the steel inner tube enables the inner pipe to be made lighter in weight insofar as the materials constituting the fibers are not as heavy as steel, while still giving mechanical performance to the pipe that is suitable for reinforcing the strength of the pipe of the inner tube both against bottom effect and against the radial bursting effect. Winding the fibers gives rise to a force having an axial component that serves to take up the bottom effect and a tangential component that serves to take up the radial effect. The respective values of the axial and tangential components depends on the angle of inclination of the helical winding of the fibers around the tube.

In the present invention, said inner tube performs solely the following two functions:

1) providing sufficient stiffness to enable said composite material to be supported during fabrication, and where appropriate prior to curing; and 2) to constitute a shield that withstands potential corrosion from a fluid flowing in said pipe.

However, in a unit coaxial pipe element of the present invention, said fibers are advantageously wound substantially circularly or helically at an angle relative to the longitudinal axis XX' of said tube when in a straight position that is at least 75° and preferably greater than 87°, more preferably than 89°, so as to provide substantially solely an ability to withstand radial force.

In a first unit coaxial pipe element of the invention, the "bottom effect" is transmitted by compression through the layer of wound fibers to the junction forgings at the ends, which forgings are secured to the outer pipe, thereby enabling the outer pipe to withstand longitudinal compression forces and thus provide the overall strength of the unit coaxial pipe element against the forces due to said bottom effect, and against tension forces that occur while laying within a J-lay tower. Thus, the fibers wound in substantially circular manner serve almost exclusively to withstand the forces due to the bursting radial effect, and they are not stressed to take up the stresses associated with the bottom effect, thus making it possible to implement a wall thickness that is even smaller. This results in an outside diameter for said inner pipe that is even smaller, thereby making it possible to implement an outer pipe, likewise of smaller inside diameter, and thus of smaller outside diameter, and thereby further reduce the weight per unit length of the coaxial pipe assembly.

Advantageously, said fibers are wound around said inner tube in a plurality of superposed layers, preferably in at least five superposed layers, the various layers possibly including inclinations of said fibers that are symmetrical relative to the perpendicular to said longitudinal axis XX', said alternating inclination remaining very small since it is close to 90°. This makes it possible to apply the various layers by winding from a single reel of fibers or filaments, which reel travels back and forth along said tube.

Preferably, said fibers are coated in an organic polymer binder that is either curable, preferably of the epoxy, polyester, polyurethane, or phenolic type, or else that is thermoplastic, preferably being of the polyolefin (polyethylene, polypropylene), polyamide, or polyetherether ketone (PEEK) type.

Also preferably, said composite material is preferably in the form of a strip or a filament comprising said fibers coated in a said binder, and said filament or said strip is wound substantially helically around said inner tube, preferably at an angle relative to the longitudinal axis XX' of said tube when in the rectilinear position that is greater than at least 75°, and preferably greater than 87°.

The thickness of the ends of the inner pipe of the invention is similar to that of a conventional pipe; in particular, it is proportional to the diameter of the pipe. More particularly, the thickness at the ends of the inner pipe lies in the range 5 mm to 35 mm, and more particularly in the range 7 mm to 25 mm.

More particularly, for an inner tube having a diameter of 100 mm to 500 mm, the thickness of said inner tubes lies in the range 1 mm to 10 mm, preferably in the range 2 mm to 5 mm, and said composite material is deposited over to a thickness of 5 mm to 50 mm, said composite material preferably comprising proportions by weight of 50% to 70% fibers and 50% to 30% binder.

In a particular embodiment, said fibers are fibers of a material that is inorganic, organic, or metallic, and selected from carbon, kevlar, glass, titanium, and other optionally metallic compounds, all presenting very high elastic performance.

In a preferred embodiment, said inner pipe includes at each end of said inner tube a ferrule type forging interposed between said inner tube and said junction forging, having a tubular wall with the same inside diameter as said inner tube to the end of which it is welded, the thickness of the tubular walls of said ferrule type forgings increasing from their ends welded to said inner tube going towards their ends welded to said junction forgings, thus defining shapes substantially inscribed in conical envelopes with their outside surfaces preferably being rough, more preferably being stepped or threaded, and likewise covered by a winding of said fibers.

A coaxial pipe element of the invention makes it possible to use an inner tube of small diameter made out of stainless steel that is suitable for withstanding corrosion from the fluid that it is desired to convey inside said inner pipe. Thus, there is no need to have recourse to an internal sheath within the inner pipe in order to give it corrosion-resistant properties.

In order to further improve the fatigue behavior in the vicinity of the connections between unit elements of coaxial pipe assemblies of the invention, said junction forging is defined as follows:

in a radial direction relative to a longitudinal axis XX' of symmetry of said forging, it is defined by a cylindrical inner wall of substantially the same diameter as the diameter of the main portion of said inner pipe, and by a cylindrical outer wall of diameter substantially equal to the outside diameter of the main portion of said outer pipe; and in the longitudinal axial direction XX':
- at the side of said junction forging that is to be welded to the ends of said outer and inner pipes of a said element of an assembly of at least two coaxial pipes, said outer and inner walls and of said junction forging forming in longitudinal section respective outer and inner first branches of substantially the same thickness as said outer and inner pipes to which they are to be assembled, said outer and inner first branches defining a first annular cavity; and
- at its opposite side where said junction forging is to be assembled to another such junction forging, itself welded to the end of another element of a set of two coaxial pipes, said outer and inner walls form in longitudinal section respective outer and inner second branches defining a second annular cavity;
- the ends of said first and second cavities being spaced apart in said longitudinal direction XX' in such a manner as to define a solid zone of said junction forging in which said outer and inner walls form the outer and inner faces of a common cylindrical wall.

The junction forging of the invention is constituted by a single metal forging, i.e. made as a single piece, preferably of steel, or preferably of a steel alloy.

Advantageously, a unit element of an assembly of at least two coaxial pipes of the invention is characterized in that:
- at least one of its ends it includes a junction forging having the ends of said outer and inner first branches to same-thickness ends of said outer and inner pipes, respectively;
- the length by which the ends of said inner and outer first branches project relative to each other on each said junction forging is suitable for matching the length whereby the ends of said outer and inner pipes project relative to each other at the ends of said elements of said coaxial pipe assemblies; and
- said annular first cavity is preferably filled with said insulating material.

The present invention thus also provides a method of assembling two unit elements, each constituted by an assembly of two coaxial pipes in accordance with the invention, the method being characterized in that the following steps are performed:

1) assembling a first said unit element of a coaxial pipe assembly of the invention, including a first junction forging at its downstream end, with a second unit element of said coaxial pipe assembly of the invention that includes a second junction forging at its upstream end, both of said outer branches of said first and second junction forgings preferably being of the same thickness, where appropriate; and 2) approaching the free ends of said two elements of assemblies of at least two coaxial pipes of the invention for assembly, and welding them together, where appropriate welding only the free ends of said outer second branches of said first and second junction forgings.

Forming said first and second annular cavities makes it possible firstly to establish continuity of the inner diameter of the inner pipe and secondly to provide relative continuity and identical second moment of area for the cross-section between the main zone of the PiP and its connection zone, the thickness of the outer branch of the junction forging being substantially equal to or slightly greater than the main thickness of the outer pipe.

Spacing the ends of said outer and inner first branches away from the end wall of the first cavity and spacing the end of said outer second branch away from the end wall of said second cavity enables welding to be performed under better conditions, since the mass of steel on either side of the welding zone is substantially equal, so the molten zone is not disturbed by a "radiator effect" caused by the solid and massive zone situated between the end walls of said first and second cavities, where such disturbance consists in unbalanced cooling between the left- and right-hand sides of a welding zone.

Finally, the continuity of the diameter of the outer wall in the vicinity of said junction forging relative to the diameter of the main portions of the outer pipes, makes it possible to create a significant increase in the second moment of area of the cross-section in the vicinity of the connection zone between two adjacent junction forgings, thereby strengthening the connection specifically where stresses are at a maximum. The second moment of area of the cross-section of a pipe relative to its center varies with the fourth power of its radius, which means that a considerable amount of thickness is needed in the prior art as described in GB-2 161 565 or GB-2 191 842. In contrast, if the cross-section under consideration corresponds to that of the outer pipe of the PiP, then the thickness required is greatly reduced, and in some configurations can be even be halved, thus considerably simplifying the operations of assembly by welding as performed on board installation ships, under conditions that can be difficult.

Furthermore, the fact that two adjacent junction forgings are welded together solely at the ends of said outer second branches enables all of the load and stress transfer phenomena to be localized in the outer level, without involving said inner walls, thus making it possible to have better control over the risk of cracking and over fatigue phenomena, and to avoid the device collapsing completely in its inner wall.

In addition, the fact that the ends of said inner and outer second branches of two adjacent forgings of the invention are not welded together allows said facing inner walls to move in very small amounts due to possible bending or pressure or temperature variations, and allows said inner walls to deform plastically, enabling said inner second branches to crumple without any risk of transferring compression loads on contact, thereby making it possible to avoid disturbing the distribution of stresses in the assembly zone, with the major fraction of stresses being taken up by via the outer walls of said forgings.

The formation of said cylindrical inner wall that ensures almost complete continuity with the inner pipe makes it possible to avoid turbulence phenomena of the vortex type in the flow of fluid inside the device after assembly on passing through the connection between two of said junction forgings between two adjacent portions of PiP.

All of these characteristics contribute to radically improving the behavior in bending and also in fatigue of a device involving two unit elements of coaxial assembly fitted with said junction forgings and connected to each other on board an installation ship.

Furthermore, fabricating and assembling said junction forgings can be performed in relatively easy and reliable manner concerning making a connection between two adjacent junction forgings and also connecting a single junction forging to the end of a set of at least two coaxial pipes.

It should be observed that after two junction forgings have been connected together, said second cavity must not be leaktight against the inside of said inner wall, and against said inner pipe, since on beginning to cause a fluid to flow therein, the fluid needs to migrate into said second cavity, with sealing being provided by the outer weld between the ends of said outer second branches, the fluid remaining trapped in said second cavity throughout the duration of the lifetime of the installation.

According to characteristics of said junction forging that are preferred and advantageous:

the free end of said outer second branch presents a shape, preferably a chamfer, making it suitable for being welded to the free end of another said outer second branch of another junction forging to which it is to be assembled, said other junction forging itself being assembled to the end of a second said element of an assembly of two coaxial pipes, and the free end of said inner second branch presents a shape for coming into abutting contact against the free end of another said inner second branch of another said junction forging assembled to the end of a said second element of a coaxial pipe assembly, but without being welded thereto;

said outer second branches of said junction forgings that are to be assembled together by welding are of the same thickness, and of thickness greater than the thickness of the outer pipe of the PiP, and preferably of thickness greater than the thickness of said inner second branch of said junction forging; and the end of said outer second branch presents a chamfer facing towards the outside and suitable for enabling welding to be performed from the outside; and the free ends of said outer and inner first branches present a shape, preferably a chamfer 8, that makes them suitable for being welded to the free ends respectively of said outer and inner pipes, and preferably suitable for being welded respectively from the outside of said outer pipe for said outer first branches and from the inside of said inner pipe for said inner first branches.

In an advantageous embodiment, said inner second branch includes in its front face at its end that is free in the longitudinal direction ZZ', a male or female centering element that is suitable for co-operating with a female or male element respectively of the front face of the free end of another said inner second branch of another said junction forging to which it is to be assembled in such a manner as to:

provide an effect of centering said junction forgings as they are approached for assembly purposes; and adjust the spacing between the end front faces of said outer second branches of said junction forgings for assembly as they are approached for assembly purposes, so that assembly can preferably be performed by welding and so that said welding can be implemented throughout the thickness of said end front faces of said outer second branches that are to be assembled together.

More particularly, said male element is constituted by a projecting shape, preferably a circularly symmetrical shape, of said front face at the end of said inner second branch, said male element being suitable for co-operating with a corresponding female element constituted by a complementary hollow shape, preferably a circularly symmetrical shape, in the front face at the end of a said inner second branch of a said other junction forging to which it is to be assembled.

Still more particularly, said projecting shape of said male element is formed by an annular gasket fitted on said front face at the end of said inner second branch.

In an advantageous embodiment, the thickness of said inner second branch decreases between the end of said second annular cavity and said front face of said inner second branch, the surface of said inner second branch thus being inscribed, for example, within a conical envelope.

This narrowed inner wall of said inner second branch enables it to act as an optional abutment, while also making it easier for it to deform plastically and possibly to crumple during bending movements or variations in pressure or temperature, so that the major fraction of the stresses is transmitted fully via said outer second branch.

In an advantageous embodiment the end of said inner first branch beside said junction forging that is suitable for being assembled directly to a said element of a said coaxial pipe assembly, projects in said axial longitudinal direction XX' relative to the end of a said outer first branch so that said junction forging can be assembled to a said coaxial pipe assembly in which the end of said outer pipe projects over substantially the same length relative to the length of said inner pipe. This embodiment becomes necessary to enable the welds connecting the junction forging to the inner and outer pipes to be welded from the outside.

More particularly, the end of said outer first branch presents an outwardly-directed chamfer suitable for enabling welding from the outside, and the end of said inner first branch presents a chamfer facing inwards and suitable for enabling welding to be performed from inside said inner pipe.

In a particular embodiment, said first and second annular cavities are oblong in shape in longitudinal section, their end walls being curved in shape with radii of curvature that are preferably identical.

Still more particularly:

the end walls of said first and second cavities are spaced apart by a distance that is equal to 0.5 to 3 times the maximum thickness of said junction forging in said solid zone;

the lengths of said inner and outer first branches form a said first cavity having a depth that is 1 to 5 times the thickness of the inner and outer pipes, respectively; and the lengths of said outer and inner second branches form a said second cavity with a depth of 1 to 5 times the thickness of said outer second branch; and the thickness of said outer second branches is 5% to 100%, and preferably 30% to 70% greater than the thickness of the outer pipe.

According to particular characteristics of a method of assembling two unit elements of an assembly of two coaxial pipes of the invention:

at least one of said inner second branches of said first and second junction forgings to be assembled together presents a thickness that tapers from the end of said second cavity towards the front face at the end of said second inner branch; and the length whereby the ends of said inner and outer second branches project one relative to the other in a said first junction forging is suitable for adapting to the length whereby the ends of said inner and outer second branches project one relative to the other in a second said junction forging to which said first junction forging is to be assembled; and said inner and outer second branches of each of said two junction forgings are such that their ends are at substantially the same level in said axial longitudinal direction XX'.

BRIEF DESCRIPTION OF THE DRAWINGS

Other characteristics and advantages of the present invention appear in the light of the following detailed description given with reference to the following figures, in which:

FIG. 1A is an axial longitudinal section of a PiP comprising a combined metal-composite inner pipe and a first junction piece 6a welded at its end using a first welding method;

FIG. 1B is an axial longitudinal section view of the second end of the FIG. 1A PiP, having a second junction piece 6b welded using a second welding method;

FIG. 2 is an axial longitudinal section of an inner pipe of combined metal-composite material $2_2$ comprising a thin inner tube of metal $2_1$, shaped end ferrules $2_3$, and composite material reinforcement wound around said thin inner tube of metal and secured thereto and also to the ferrules, presenting an outside surface shown in detail in FIG. 2A;

FIG. 3 is a plan view of a preferred method of fabricating the composite reinforcement corresponding to FIG. 2;

FIG. 4 is an axial longitudinal section of the connection between two lengths of PiP each fitted with a junction piece 1a, 1b at its end;

FIGS. 4A to 4E show variant embodiments of the ends of junction pieces where they are connected together.

DETAILED DESCRIPTION OF THE PRESENTLY PREFERRED EMBODIMENTS

Figure 5:
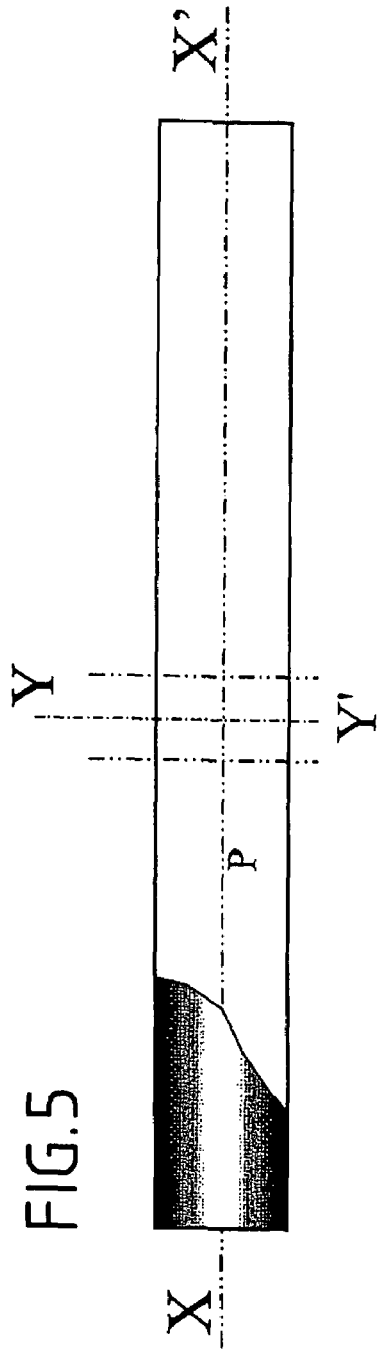
FIG. 5 is an axial longitudinal section of a pipe in general, and shows the bottom effect generated by internal pressure P within said pipe.

In FIGS. 1A-1B there can be seen a pipe 1 of the PiP type constituted by a pipe 3 welded to a first junction piece 6a in the form of a forging situated to the left of FIG. 1A and to a second junction piece 6b in the form of a forging situated to the right of FIG. 1B.

The junction forging 6a is a circularly symmetrical part presenting:
- on its left, a simple tubular shape $6_1$ of inside diameter corresponding to the diameter of the inner pipe 2, a chamfer 8 is machined so as to enable it to be welded at 10 to the end of the junction forging 6b of another unit length of PiP; and
- on its right, two concentric tubular shapes $6_2$, $6_3$, the outside shape $6_3$ being welded to the outer pipe 3, and the inside tubular shape $6_2$ being connected to the end of the inner pipe 2. The junction forging 6a is welded in conventional manner from the outside of the pipe both to the inner pipe and to the outer pipe.

For clarity in the description, in FIGS. 1A, 1B, and 4, the various component elements are shown as being welded together in the bottom halves of said figures, and they are shown as being positioned face to face prior to said welds being made in the top halves thereof.

The junction forging 6b is similar to the forging 6a, but the welding to the inner pipe is performed from inside said pipe, and as a result presents a chamfer 8 that faces inwards, as shown in FIG. 1B.

The inner pipe 2 of combined metal and composite material is shown in FIG. 2 and comprises a thin inner tube $2_1$ of metal, preferably of stainless steel, welded at 13 to shaped end ferrules $2_3$a, $2_3$b, the ferrule $2_3$a presenting an outwardly-facing chamfer 8a, and the ferrule $2_3$b presenting an inwardly-facing chamfer 8b for co-operating with the junction forgings 6a and 6b, as explained above. FIG. 2A shows detail of the assembly by welding 13 between the inner tube $2_1$ of metal and the ferrule forging $2_3$. The wall thickness of the ferrules increases until their outside diameter becomes substantially equal to that of the junction forgings 6a and 6b. The outside surfaces of the ferrules are thus conical in shape, and furthermore they present an undulating shape that is preferably stepped by means of a thread $2_4$. The ferrules $2_3$ perform two functions of providing a connection between the fine inner tube and the junction forgings 6a or 6b, and of anchoring fibers of composite material wound around the outside surfaces thereof. Thus, the ferrules can transmit internal compression forces within a pipe under pressure, transmitted by the composite material $2_2$ respectively to each of the ferrules $2_3$a and $2_3$b.

The composite material $2_2$ is constituted by helically winding a sheet of carbon fiber of 5 mm×1 mm rectangular section constituted by filament having a unit section of 7 micrometers (µm) that passes firstly in a non-cured state, through an impregnation unit 14 in which the fiber is coated in a curable organic polymer that is still in a non-completely cured state, such as an epoxy or a polyurethane polymer. The filament is then spiral-wound in conventional manner as shown in FIG. 3 so as to constitute a uniform mass of fibers that are oriented at an inclination of about 87°-89° so as to withstand substantially solely the radial bursting effect when the pipe is subjected to internal pressure P. Curing is completed after winding around the tube $2_1$ and the ferrule $2_3$.

The fibers constitute 50% to 70% of the volume of the final composite. The filament is wound in a plurality of layers, e.g. at least five layers. Thus, the composite material $2_2$ presents a thickness of at least 5 mm for an inner tube $2_1$ having thickness reduced to a value in the range 1 mm to 10 mm for the tube $2_1$ having an inside diameter of 200 mm to 500 mm.

Figure 5C:
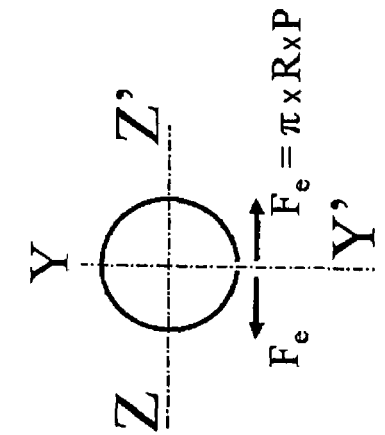
FIGS. 5A to 5C show the radial bursting forces on the pipe under the effect of the internal pressure P.
Figure 5B:
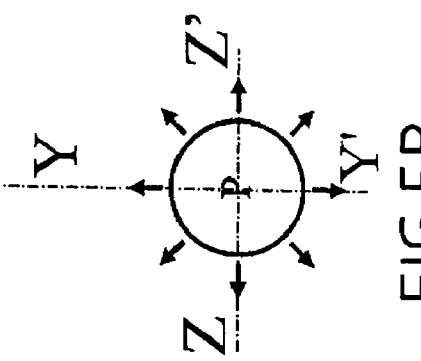
Figure 5A:
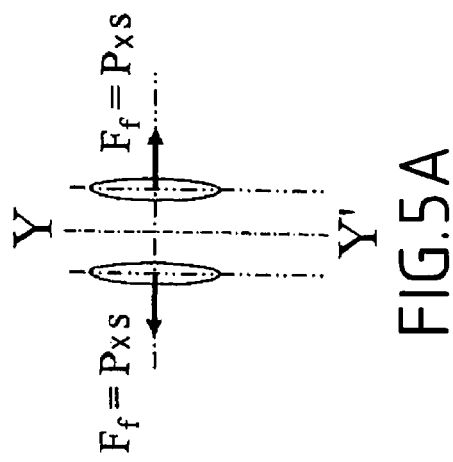

As shown in FIGS. 5 and 5A to 5C, the pressure P inside a pipe leads firstly to a bottom effect or piston effect shown in FIG. 5A that presents the value $F_1 = P \times s$, where s is the section of the pipe, and secondly to a radial effect that tends to burst the pipe, the force acting on a unit length of wall being shown in FIG. 5C and having the value $F_e = \pi \times R \times P$, where R represents the inside radius of the pipe.

In the PiP of the invention, the angle of inclination of the fibers is preferably greater than 87°, and in particular at least 89°, since the fibers or filaments are not required to take up the bottom effect. The bottom effect is transmitted by compression within the matrix of the composite material $2_2$ as far as the junction forgings 6a and 6b, which are secured to the outer pipe and which thus serve to take up the forces and thus provide the element 1 of the PiP with its overall ability to withstand the forces due to said bottom effect, and also to the traction forces generated during installation from a laying ship, from within a J-lay tower.

Thus, the fibers of composite material $2_2$ wound in substantially circular manner, i.e. with a spiral angle greater than 87°-89° as shown in FIG. 3, are positioned so as to withstand the unit length forces $F_e$, while the bottom effect $F_f$ is transmitted by compression within the composite material $2_2$ to the ends of said inner pipe 2, and then transmitted to the junction forgings 6a and 6b and taken up by the outer pipe 3 which is dimensioned accordingly.

By way of example, a prior art PiP type pipe having an inside diameter of 288.85 mm, and dimensioned to withstand fluid at an internal pressure of 250 bars, presenting a space between the inner pipe and the outer pipe for receiving an aerogel type insulation system that is 23 mm wide, and that is to be laid at a depth of 2500 m of water, possesses the following characteristics:
- inside diameter of the inner pipe=288.85 mm;
- thickness of the inner pipe=17.5 mm;
- inside diameter of the outer pipe=369.85 mm;
- thickness of the outer pipe=17.5 mm; and
- weight per unit length of the main portion of the empty PiP in water=171.59 kg/ml.

A pipe of similar performance made in accordance with the invention presents the following characteristics in its main portion:
- inside diameter of the inner pipe=288.85 mm;
- thickness of the thin inner pipe of stainless steel=2 mm;
- thickness of the composite material of the inner pipe=12.5 mm;
- inside diameter of the outer pipe=347.85 mm;
- thickness of the outer pipe=17.5 mm; and weight per unit length of the main portion of the empty PiP in water=69.22 kg/ml.

Thus, the unit weight of the main portion of the inner pipe 2 is reduced, not only by using the composite material $2_2$ which is lighter than steel, but also because of the very high performance of carbon fibers that are used solely for withstanding bursting and that are not directly stressed for taking up the stresses associated with the bottom effect, thus leading to a wall thickness that is reduced significantly. This results in an outside diameter for the inner pipe that is smaller, thus leading to an outer pipe 3 that also has an outside diameter that is smaller, and that is therefore lighter per unit length, with this contributing significantly to the desired overall saving in weight per unit length, which in the example mentioned represents a reduction in weight per unit length of the pipe laid empty in sea water of 59.66%.

In a method of fabricating an insulated pipe or an insulated pipe assembly of the invention, as shown in FIGS. 1A and 1B, the following steps are performed:

1) a shaped end ferrule $2_3$ is welded to each of the ends of an inner tube $2_1$ made of metal, the ferrules having a structured surface $2_4$, and comprising a ferrule of type $2_3a$ on the left and of type $2_3b$ on the right; then 2) reinforcement of composite material $2_2$ constituted by fiber filaments coated in curable polymer in an uncured state is wound in substantially circular manner around the inner pipe $2_1$ and the ferrules $2_3$, starting from one end and continuing to the other end of the inner pipe 2, after which the assembly is cured; then 3) the end of the shaped end ferrule $2_3a$ is welded at 16 from the outside from the junction forging 6a; then 4) the outer pipe 3 is engaged from right to left around the inner pipe 2 while being maintained concentric thereabout by using centralizer elements 17, and is then welded from the outside at 18 to the junction forging 6a; then 5) the insulating material $4_2$ is inserted between the inner and outer pipes 2 and 3; then 6) the junction forging 6b is presented to the right-hand end of the inner and outer pipes 2 and 3 and the concentricity of the various elements is adjusted relative to one another; then 7) said junction forging 6b is welded firstly to the outer pipe 3 by acting from the outside at 18, and the same forging 6b is welded to the inner pipe 2 at 16, acting from inside the pipe; and then 8) where appropriate, a vacuum is established inside the space $4_1$ between the inner pipe and the outer pipe; and the orifice used for drawing the vacuum (not shown) is closed in leaktight manner.

In a preferred version of the invention, the end forgings 6a and 6b are made as shown in FIG. 4.

Each junction forging 6a, 6b is defined as follows:

in a radial direction relative to a longitudinal axis XX' of symmetry of said forging, it is defined by a cylindrical inner wall $7_2$ of substantially the same diameter as the main portion of said inner pipe $2_2$, and by a cylindrical outer wall $7_1$ of diameter substantially equal to the outside diameter of the main portion of said outer pipe 3; and in the longitudinal axial direction XX':

beside said junction forging that is for welding 10 to the ends of said inner and outer pipes of a said element comprising an assembly of at least two coaxial pipes, said outer and inner walls $7_1$ and $7_2$ of said junction forging form in longitudinal section first branches that are respectively an outer branch $8_1$ and an inner branch $8_2$ of substantially the same thicknesses as said outer and inner pipes 3 and 2 to which they are to be assembled, said outer and inner first branches $8_1$ and $8_2$ defining a first annular cavity 11; and on the opposite remote side of said junction forging that is to be assembled to another such junction forging, itself welded 10 to the end of another element of an assembly of two coaxial pipes, said outer and inner walls $7_1$ and $7_2$ form in longitudinal section second branches constituting respectively an outer branch $9_1$ and an inner branch $9_2$ defining between them a second annular cavity 12;

the end walls $11_1$ and $12_1$ of said first and second cavities 11 and 12 being spaced apart in said longitudinal direction XX' in such a manner as to define a solid zone 13 of said junction forging in which said outer and inner walls $7_1$, $7_2$ form the outer and inner faces of a single cylindrical wall.

As shown in FIG. 4, the first annular cavity 11 is open to the annular space $4_1$ and can receive the insulating material $4_2$ so as to continue the insulation of the pipe as far as possible.

After two unit lengths of PiP fitted with junction forgings of the invention have been assembled and connected together, the second annular cavity 12 of a first junction forging at the downstream end of a first length of PiP is open to a second annular cavity of a second junction forging 6a at the upstream end of a second length of PiP, thus forming a chamber that is formed by welding at the ends of the outer second branches $9_1$. However this chamber is not leaktight since the ends of the inner second branches $9_2$ of the two junction forgings 6a and 6b are not welded together, the faces of said branches merely coming into contact with each other.

According to the invention, the free ends of said outer and inner first branches $8_1$ and $8_2$ present chamfered shapes 8 that enable a first welding path of the so-called "full penetration" type to be performed in known manner followed by the chamfer being filled completely as designated by reference 10. At the right of FIG. 4, the chamfers 8 face outwards and they are therefore suitable for being welded from outside said outer and inner pipes $8_1$ and $8_2$. At the left of FIG. 4, the chamfers 8 face outwards at the end of the outer first branch, and inwards at the end of said inner first branch, thus making them suitable for being welded respectively from outside said assembly for said outer first branches and from inside said inner pipe for said inner first branches.

In FIG. 4, the free end of said outer second branch $9_1$ presents a chamfered shape 8 directed towards the outside of a first junction forging 6a, making it suitable for welding from the outside to the free end of another said outer second branch of another junction forging 6b to which it is to be assembled, said other junction forging itself being at the end of a second element comprising an assembly of two coaxial pipes.

In the junction forging 6a, the end of said inner first branch $8_2$ beside said junction forging and suitable for being assembled directly to a said element of a said set of coaxial pipes, projects in said axial longitudinal direction XX' relative to the end of a said outer first branch $8_1$ so that said junction forging can be welded to a said set of coaxial pipes in which the end of said outer pipe projects beyond the end of said inner pipe.

In a preferred version, the junction forgings 6a and 6b are made as shown in FIG. 4, presenting an outside diameter and a wall thickness that are substantially equal, and preferably exactly equal to those of the main portion of the outer pipe. By proceeding in this way, the pipe presents a substantially constant second moment of area over its entire length, thus avoiding stress accumulating at connections between two unit lengths of PiP and considerably improving the bending and fatigue behavior of the pipe, thereby enabling it to withstand an entire working lifetime of installations that may exceed 30 years, particularly in bottom-to-surface connections that are subjected to the effects of swell and current.

In order to avoid undesirable vortex phenomena at the connections between two junction forgings 6a and 6b of two adjacent PiP portions, when crude oil flows inside the inner pipe, the inside diameter of the junction forging 6a is extended as far as the junction face of the corresponding forging 6b, but the junction is not welded, so as to avoid any phenomena of load and stresses being transferred between the outer pipe and the inner pipe since that might lead to cracking or to fatigue phenomena that would inevitably lead to total ruin of the pipe. The two extensions of the inner portions thus serve merely to provide continuity of the inside diameter of the inner pipe and they can be machined in numerous ways, as shown in FIGS. 4A to 4E.

In FIG. 4A, the end face 7 of the end forging 6b presents a circularly cylindrical male shape that cooperates with a corresponding female shape of the end face of the junction forging 6a, thus serving not only to center the two end forgings automatically as they are docked together for final assembly at the site for laying the pipe within a J-lay tower, but serves also to adjust the spacing of the parallel faces of the two chamfers 8, which spacing must be very precise in order to enable welding to be performed in conventional manner with full penetration so as to obtain good strength.

The shape shown in FIG. 4B does not enable self-centering to be achieved between the two parts relative to each other and requires an external or internal centering device to be used during welding, but it does enable the spacing between the parts in the chamfer zone to be guaranteed. It should also be observed that the junction forging 6b presents a wall of reduced thickness, enabling it to act as an abutment during the welding stage. However because of its reduced thickness, in the event of small movements between the facing walls due to bending, or to pressure and temperature variations, said thin wall will tend to deform plastically and crumple, since it does not present sufficient section and thus sufficient strength to transfer compression loads on contact. This avoids disturbing stress distribution in said assembly zone, and practically all of the stress is taken up via the outer branches $9_1$. Bending behavior during laying is thus greatly improved, and with bottom-to-surface connections the fatigue behavior enables lifetime targets to be achieved, i.e. 30 or more years, even in seas that are reputed to be difficult, such as the North Sea and the Gulf of Mexico.

In FIGS. 4A to 4D, only one of said inner second branches $9_2$ of said first and second junction forgings for assembling together presents thickness that tapers from the end wall $11_1$ of said second cavity towards said front face 7 at the end of said inner second branch $9_2$, and said outer and inner second branches $9_1$ and $9_2$ of each of said two junction forgings are such that their ends are substantially at the same level in said axial longitudinal direction of their inner and outer second branches $9_2$ and $9_1$. However, it is possible to envisage each of the forgings 6a and 6b presenting the same conical shape leading to a smaller contact section so as to avoid the above-described undesirable phenomena.

In FIG. 4E, both inner second branches present thickness that tapers from the end walls of the second cavity towers their tips, however in this example they overlap one above the other, with their end front faces no longer facing each other.

By way of example, for a junction forging 6a having an inside diameter of 300 mm, and presenting an inner pipe thickness of 19 mm, the tapering stub of the corresponding junction forging 6b is advantageously reduced to 3 mm so as to eliminate the above-described undesirable phenomena.

In FIG. 4D, there can be seen a fitted gasket 7a, preferably a metal gasket, or more particularly a discontinuous or porous metal ring that acts merely as a centralizer. The gasket should not be leaktight so as to allow fluid to pass from inside the inner pipe into the chamber 12a.

The second annular cavity 12 is oblong in shape, with the radius of curvature of its circular end wall $12_1$ preferably being identical to the radius of curvature $11_1$ of the first annular cavity 11 in the connection zone with the outer pipe 3 and the inner pipe 9 of the PiP. This annular second cavity 12 should not be leaktight against the inside of the inner pipe, but should be in communication therewith, since during final testing or when starting production, fluid migrates into said second cavity 12, with the pipe itself being made leaktight by the outer bead of welding 10, and with said fluid becoming trapped therein throughout the lifetime of the installation, with practically no renewal.

The outside diameter of said outer first wall $7_1$ is generally 150 mm to 750 mm or more, while the inside diameter of said inner wall $7_2$ of said junction forging lies in the range 50 mm to 700 mm.

By way of example, the conventional PiP of the above example constituted by an inner pipe having an inside diameter of 288.85 mm and a thickness of 17.5 mm, and an outer pipe with an inside diameter of 369.85 mm and a thickness of 17.5 mm has a cross-section presenting a second moment of area about its center equal to 598,444,402 $mm^4$.

To provide an equivalent second moment of area at the assembly between two unit lengths, it is necessary:
  according to the prior art patent GB 2 161 565, to have a junction forging without an additional fitted sleeve, presenting a wall thickness at the connecting weld between two unit lengths of PiP equal to 42 mm; and
  according to the invention, a forging without an additional sleeve, presenting a wall thickness at the connection weld between two unit lengths of PiP that is equal to 28.5 mm, i.e. the thickness of said outer second branches is equal to 28.5 mm.

Thus, the thickness of the junction forging of the invention, at its outer second branch, remains reasonable and is substantially greater than the thickness of the outer pipe, without requiring an additional sleeve to be fitted, where an additional sleeve does not provide good reliability over time.

When welding steel of great thickness, i.e. greater than 25 mm to 30 mm, it is necessary to apply welding procedures that are very difficult, and in particular difficult to perform in a short length of time.

With extreme thicknesses in the range 40 mm to 50 mm or more, it can be necessary to provide chamfers in X-shaped configuration, thus requiring one stage of welding from the outside and another stage of welding from the inside, thereby considerably complicating the installation of pipes on board laying vessels and significantly increasing the time required, and also the risk of the welds breaking over time, because of the complexity of performing them on site.

In the above example of a composite PiP of the invention, made up of an inner pipe having an inside diameter of 288.85 mm that is made of thin stainless steel with a thickness of 2 mm, and that is reinforced by carbon fiber reinforcement having a thickness of 12.5 mm, together with an outer pipe having an inside diameter of 347.85 mm and a thickness of 17.5 mm, the second moment of area of its cross-section about its center is equal to 401,254,049 $mm^4$.

To provide an equivalent second moment of area in the assembly between two unit lengths, it is necessary:
  according to the prior art of patent GB 1 161 565, to use a junction forging without an additional fitted sleeve, presenting a wall thickness at the connection weld between two unit lengths of PiP that is equal to 31 mm; and according to the invention, a forging without an additional sleeve that presents a wall thickness at the connection weld between two unit lengths of PiP that is equal to 18.6 mm, i.e. said outer second branches have a thickness equal to 18.6 mm.

The assembly method using junction forgings of the invention thus constitutes an advantageous way of making bottom-to-surface connections that need to withstand fatigue over periods of 20 years to 30 years or even more, because there is no external fitted sleeve and because of the reasonable thickness of the outer second branch, thus enabling conventional welding procedures to be used that are thoroughly mastered.

Thus, associating forgings of the invention with a composite PiP of the invention makes it possible radically to reduce the thickness required of the forgings that provide the junctions between two elements, thereby considerably facilitating welding stages during installation, increasing the reliability of the product as laid, and reducing the time required for welding, thereby increasing laying rates, thus leading to very significant financial savings.

The invention claimed is:

1. A unit element of undersea pipe comprising an assembly of two coaxial pipe elements of the pipe-in-pipe (PiP) type presenting an inner pipe element and an outer pipe element coaxial thereabout with an annular space between the pipes, including a thermally insulating material in said annular space, and including at each end a junction piece in the form of a steel forging for connecting together two of said unit elements of axial pipe, said junction forgings being welded to the ends of both of said inner and outer pipes, said unit elements being characterized in that said inner pipe element comprises in its main portion an inner tube of metal presenting a thickness that is small relative to the thickness of the ends of said inner pipes that are welded to said junction forgings, the thickness of said inner tube being less than 50% the thickness of said ends of said inner pipe, said inner tube being covered in a composite material comprising longitudinal continuous fibers wound around said inner tube so as to cover the surface of said inner tube entirely.

2. A unit element according to claim 1, wherein fibers are wound substantially circularly or helically at an angle relative to the longitudinal axis XX' of said tube when in a rectilinear position of at least 75°.

3. A unit element according to claim 2 wherein said fibers are wound around said inner tube over a plurality of layers, the plurality of layers including a symmetrical inclination of said fibers relative to the perpendicular to said longitudinal axis XX'.

4. A unit element according to claim 1 wherein said fibers are wound around said inner tube over a plurality of layers, the plurality of layers including a symmetrical inclination of said fibers relative to the perpendicular to said longitudinal axis XX'.

5. A unit element according to claim 4, wherein said fibers are coated in a thermoplastic or a curable organic polymer binder.

6. A unit element according to claim 1, wherein said fibers are coated in a thermoplastic or a curable organic polymer binder.

7. A unit element according to claim 6, wherein said composite material is in the form of a strip or filament comprising said fibers coated in a said binder, and said filament or said strip being wound substantially helically about said inner tube.

8. A unit element according to claim 7, wherein said inner tube presents a thickness of 1 mm to 10 mm, for an inside diameter lying in the range 100 mm to 500 mm, and said composite material is deposited over a thickness of 5 mm to 50 mm.

9. A unit element according to claim 1, wherein said fibers are fibers of mineral, organic, or metallic material, said composite material preferably comprising proportions by weight of 50% to 70% fibers and 50% to 30% binder.

10. A unit element according to claim 9, wherein said inner pipe includes at each end of said inner tube a ferrule type forging interposed between said inner tube and said junction forging, having a tubular wall with the same inside diameter as said inner tube to the end of which it is welded, the thickness of the tubular walls of said ferrule type forgings increasing from their ends welded to said inner tube going towards their ends welded to said junction forgings, thus defining shapes substantially inscribed in conical envelopes with their outside surfaces covered by a winding of said fibers.

11. A unit element according to claim 1, wherein said inner pipe includes at each end of said inner tube a ferrule type forging interposed between said inner tube and said junction forging, having a tubular wall with the same inside diameter as said inner tube to the end of which it is welded, the thickness of the tubular walls of said ferrule type forgings increasing from their ends welded to said inner tube going towards their ends welded to said junction forgings, thus defining shapes substantially inscribed in conical envelopes with their outside surfaces covered by a winding of said fibers.

12. A unit element according to claim 11, wherein said junction forging is defined as follows:

in a radial direction relative to a longitudinal axis XX' of symmetry of said forging, it is defined by a cylindrical inner wall of substantially the same diameter as the diameter of the main portion of said inner pipe, and by a cylindrical outer wall of diameter substantially equal to the outside diameter of the main portion of said outer pipe; and in the longitudinal axial direction XX':

at the side of said junction forging that is to be welded to the ends of said outer and inner pipes of a said element of an assembly of at least two coaxial pipes, said outer and inner walls of said junction forging forming in longitudinal section respective outer and inner first branches of substantially the same thickness as said outer and inner pipes to which they are to be assembled, said outer and inner first branches defining a first annular cavity; and at its opposite side where said junction forging is to be assembled to another such junction forging, itself welded to the end of another element of a set of two coaxial pipes, said outer and inner walls form in longitudinal section respective outer and inner second branches defining a second annular cavity;

the ends of said first and second cavities being spaced apart in said longitudinal direction XX' in such a manner as to define a solid zone of said junction forging in which said outer and inner walls form the outer and inner faces of a common cylindrical wall.

13. A unit element according to claim 1, wherein said inner tube is made of stainless steel that is suitable for withstanding corrosion by the fluid conveyed in said pipe.

14. A unit element according to claim 1, wherein said junction forging is defined as follows:

in a radial direction relative to a longitudinal axis XX' of symmetry of said forging, it is defined by a cylindrical inner wall of substantially the same diameter as the diameter of the main portion of said inner pipe, and by a cylindrical outer wall of diameter substantially equal to the outside diameter of the main portion of said outer pipe; and in the longitudinal axial direction XX':

at the side of said junction forging that is to be welded to the ends of said outer and inner pipes of a said element of an assembly of at least two coaxial pipes, said outer and inner walls and of said junction forging forming in longitudinal section respective outer and inner first branches of substantially the same thickness as said outer and inner pipes to which they are to be assembled, said outer and inner first branches defining a first annular cavity; and at its opposite side where said junction forging is to be assembled to another such junction forging, itself welded to the end of another element of a set of two coaxial pipes, said outer and inner walls form in longitudinal section respective outer and inner second branches defining a second annular cavity;

the ends of said first and second cavities being spaced apart in said longitudinal direction XX' in such a manner as to define a solid zone of said junction forging in which said outer and inner walls form the outer and inner faces of a common cylindrical wall.

15. A unit element according to claim 14, wherein:

the free end of said outer second branch presents a shape, making it suitable for being welded to the free end of another said outer second branch of another junction forging to which it is to be assembled, said other junction forging itself being assembled to the end of a second said element of an assembly of two coaxial pipes; and the free end of said inner second branch presents a shape enabling it to come into abutting contact without being welded to the free end of another said inner second branch of another said junction forging assembled to the end of a said second element of a coaxial pipe assembly; and both of said outer second branches of said two junction forgings for assembling together by welding being of the same thickness greater than the thickness of said inner second branch of said junction forging.

16. A unit element according to claim 15, wherein said first and second annular cavities are oblong in shape in longitudinal section, having end walls presenting curved shapes.

17. A unit element according to claim 14, wherein said first and second annular cavities are oblong in shape in longitudinal section, having end walls presenting curved shapes with radii of curvature that are preferably identical.

18. A method of assembling two elements according to claim 1, wherein a first said coaxial pipe element including a first junction forging at its downstream end is assembled with a second said coaxial pipe element including a second said junction forging at its upstream end, by performing steps in which the free ends of said first and second junction forgings of said two coaxial pipe elements for assembly are moved towards each other and welded together.

19. A bottom-to-surface connection undersea pipe constituted by assembling together a plurality of unit elements according to claim 1, wherein a first said coaxial pipe element including a first junction forging at its downstream end is assembled with a second said coaxial pipe element including a second said junction forging at its upstream end, by performing steps in which the free ends of said first and second junction forgings of said two coaxial pipe elements for assembly are moved towards each other and welded together.

20. A unit element according to claim 1, wherein said fibers are selected from carbon, keviar, glass, and titanium.

\* \* \* \* \*